April 6, 1948.  C. L. EKSERGIAN ET AL  2,438,966

WHEEL

Filed Dec. 31, 1943  2 Sheets-Sheet 1

INVENTORS
Carolus L. Eksergian,
Robert B. Temple and
Eugene P. Hawthorne

BY John P. Tarbox
ATTORNEY

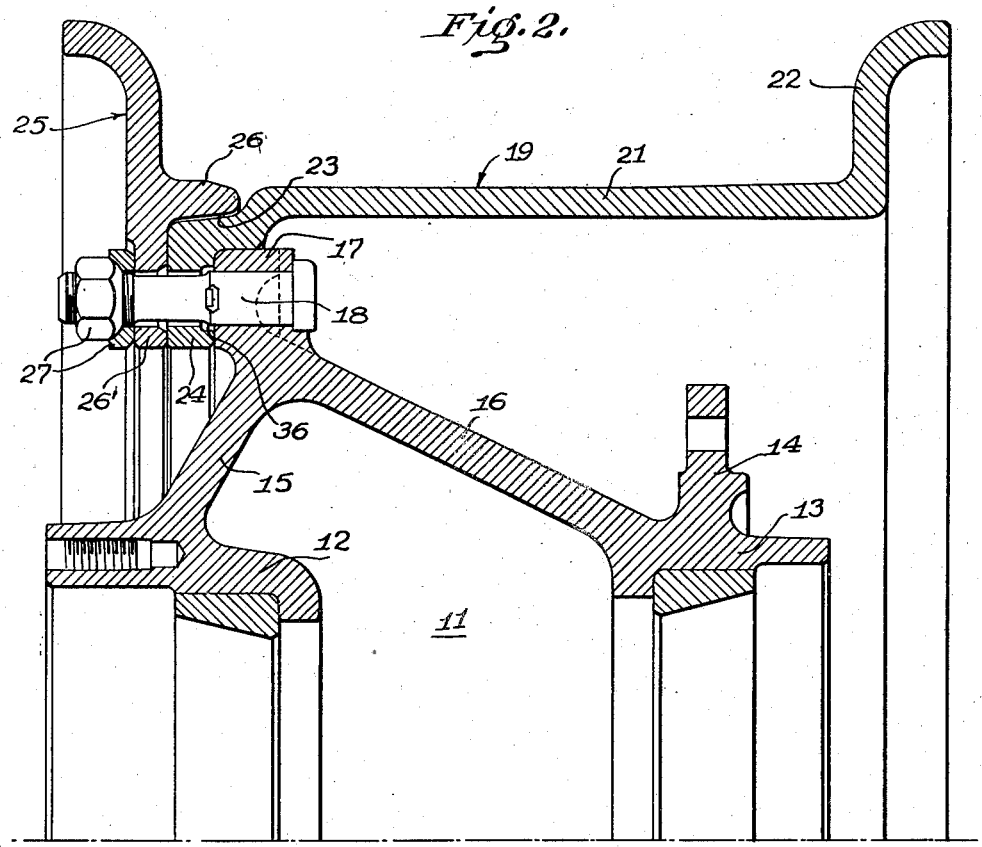
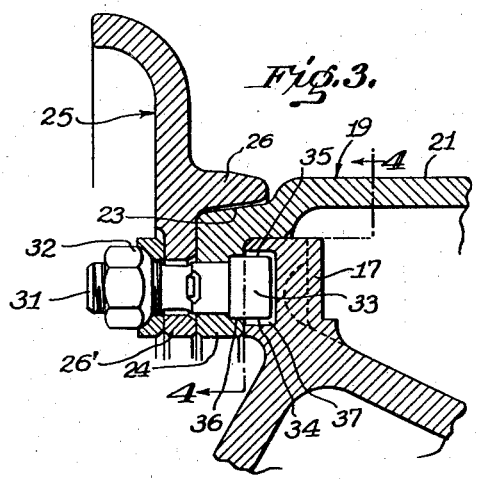
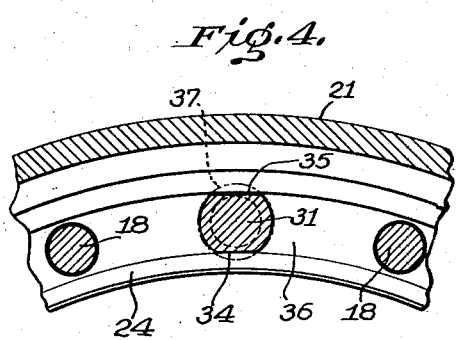

Patented Apr. 6, 1948

2,438,966

UNITED STATES PATENT OFFICE 2,438,966

WHEEL

Carolus L. Eksergian, Detroit, Robert B. Temple, Grosse Pointe Park, and Eugene P. Hawthorne, Detroit, Mich., assignors to The Budd Company, Philadelphia, Pa., a corporation of Pennsylvania Application December 31, 1943, Serial No. 516,376

1 Claim. (Cl. 301—35)

This invention relates to wheels for use with pneumatic tires, particularly to heavy duty wheels although it will be apparent from the following description that many features of the invention are equally well adapted to a wide variety of wheel structures and types.

An object of this invention is to provide an improved wheel construction for heavy duty purposes.

A further object is to provide a wheel having an improved construction and arrangement for mounting a divided rim on a supporting flange, the latter preferably being formed as an integral part of the wheel hub.

A further object is to provide a wheel structure having a divided rim in which the fastening means used in connecting the separable rim parts together is employed to augment the driving connection between the rim and the associated bolting-on flange.

Figure 1:
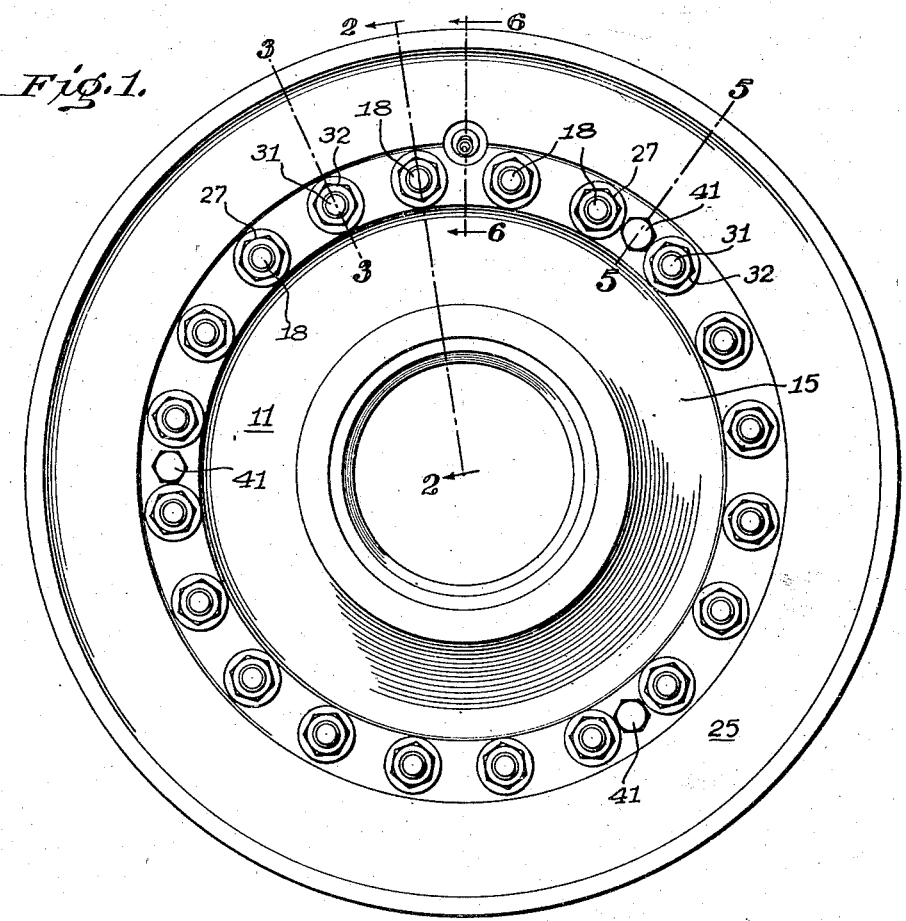
Figure 5:
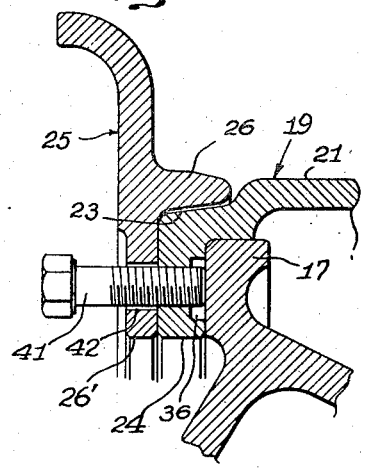
Figure 6:
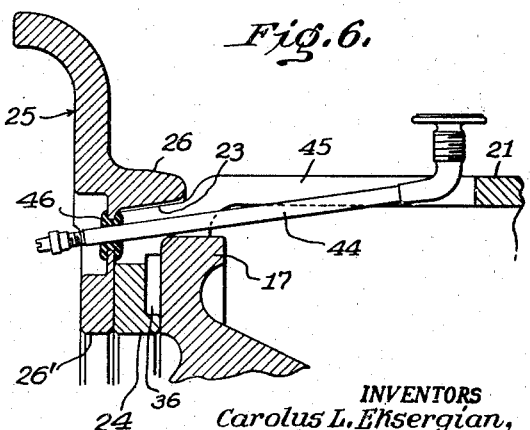

These and other objects which will be apparent are accomplished by the invention hereinafter described and illustrated in the accompanying drawing in which:

Fig. 1 is a view in elevation of a wheel constructed in accordance with one embodiment of this invention, Fig. 2 is a section on the line 2—2 of Fig. 1, Fig. 3 is a section on the line 3—3 of Fig. 1, Fig. 4 is a section on the line 4—4 of Fig. 3, Figs. 5 and 6 are sections on the lines 5—5 and 6—6 of Fig. 1.

The illustrated embodiment of the invention comprises a hub 11 having spaced outboard and inboard bearing seats 12 and 13, respectively, and an inboard radial flange 14 for mounting a brake drum, not shown. The hub is formed with outwardly extending, converging walls 15 and 16 extending angularly outward from the bearing seats 12 and 13, respectively, to form a strong support for an annular bolting-on flange 17 in which are mounted a series of rim supporting studs 18 secured in the flange in any conventional manner. A divided rim includes a rim section 19 having an axially extending surface 21 terminating in a tire retaining flange 22 at one edge and a depressed seat 23 at the other edge which is also provided with a radial securing flange 24. A cooperating rim section 25 has a bead supporting surface 26 engaging the seat 23, and a radial securing flange 26'. The two rim sections are mounted on the studs 18 and secured in place by ball nuts and washers 27.

The separable parts 19 and 25 of the divided rim are also independently secured together to permit dismounting thereof as a unit from the bolting-on flange. For this purpose relatively short rim clamping studs 31 are secured in the radial flange 24 of the inboard rim member 19, and the radial securing flange 26' of the outboard rim member 25 is mounted thereon and secured thereto by ball nuts and washers 32. The heads 33 of the short rim-securing bolts 31 have flattened faces 34 and 35, see Fig. 4, which engage the edges of an annular recess 36 formed in the inner face of the securing flange 24 of the inboard rim member 19, for the purpose of holding the stud in the flange against turning.

The bolt heads 33 are of substantial size and, when the rim is mounted on the bolting-on flange 17 these heads project into openings or recesses 37 formed in the outboard face of the bolting-on flange 17, see Fig. 3. This augments the driving connection between the flange and the rim provided by the conventional bolting-on studs 18. The recess 37 is deeper than the projecting portion of the bolt heads 33 to insure clamping engagement between the bolting-on flange and the inner face of the rim securing flange 24, and is of circular contour as indicated in dotted lines in Fig. 4, the diameter of the recess being sufficient to accommodate manufacturing tolerances in the center spacing of the studs 31. In the illustrated embodiment one out of every four studs employed is a short stud 31, the remaining studs being the conventional clamping studs 18.

As shown in Figs. 1 and 5, a plurality of jack screws 41 are provided. These screws extend loosely through openings 42 in the outer rim-securing flange 26 and are threaded through the inner rim-securing flange 24 so as to bear on the adjacent face of the bolting-on flange 17 to provide means for forcing the rim off the bolting on flange, when necessary.

In Fig. 6 is shown the valve stem arrangement in which an angularly extending valve stem 44 extends outwardly through a slot 45 in the rim section 19, and through a resilient doughnut shaped gasket 46 mounted in an opening in the securing flange 26 of the outer rim member 25.

Although we have described a specific embodiment of this invention in detail, it will be apparent that the invention can be variously modified and adapted within the scope of the appended claim.

What is claimed is:

A wheel comprising a bolting-on flange, a tire supporting rim including separable parts each having radial securing flanges provided with aligned openings, an annular recess being formed in the face of one of said flanges, means securing said flanges together including bolts extending through said openings and having flat-sided heads non-rotatably engaging the walls of said recess, and means securing said rim to said bolting-on flange including studs mounted in said bolting-on flange and extending through said securing flanges.

CAROLUS L. EKSERGIAN.
ROBERT B. TEMPLE.
EUGENE P. HAWTHORNE.

REFERENCES CITED

The following references are of record in the file of this patent:

UNITED STATES PATENTS

| Number | Name | Date |
|---|---|---|
| 1,295,792 | Putnam | Feb. 25, 1919 |
| 1,441,768 | Williams | Jan. 9, 1923 |
| 1,494,888 | Clark | May 20, 1924 |
| 1,800,100 | Padgett | Apr. 7, 1931 |
| 1,954,757 | Maranville | Apr. 10, 1934 |
| 2,209,803 | Webb | July 30, 1940 |

FOREIGN PATENTS

| Number | Country | Date |
|---|---|---|
| 101,949 | Great Britain | Nov. 12, 1916 |
| 136,470 | Great Britain | Dec. 18, 1919 |